United States Patent [19]

Balaban et al.

[11] Patent Number: 4,700,217
[45] Date of Patent: Oct. 13, 1987

[54] CHROMINANCE SIGNAL PHASE LOCKED LOOP SYSTEM FOR USE IN A DIGITAL TELEVISION RECEIVER HAVING A LINE-LOCKED CLOCK SIGNAL

[75] Inventors: Alvin R. Balaban, Lebanon; Walter H. Demmer, Plainsboro Township, Middlesex County; Leopold A. Harwood, Bridgewater; Chandrakant B. Patel, Hopewell, all of N.J.

[73] Assignee: RCA Corporation, Princeton, N.J.

[21] Appl. No.: 893,185

[22] Filed: Aug. 5, 1986

[51] Int. Cl.[4] .......................... H04N 9/66; H04N 9/45
[52] U.S. Cl. ........................................ 358/23; 358/13; 358/19
[58] Field of Search .............................. 358/13, 23, 19

[56] References Cited

U.S. PATENT DOCUMENTS

| | | | |
|---|---|---|---|
| 4,349,833 | 9/1982 | Clarke | 358/23 |
| 4,380,742 | 4/1983 | Hart | 331/1 A |
| 4,476,490 | 10/1984 | Kaneko | 358/148 |
| 4,488,170 | 12/1984 | Nillesen | 358/26 |
| 4,500,909 | 2/1985 | Machida | 358/17 |
| 4,504,799 | 3/1985 | Elmis et al. | 331/1 A |
| 4,558,348 | 12/1985 | Bolger et al. | 358/21 R |
| 4,558,351 | 12/1985 | Fling et al. | 358/21 R |
| 4,600,937 | 7/1986 | Kudo et al. | 358/21 R |
| 4,625,232 | 11/1986 | Nilesen | 358/23 |

OTHER PUBLICATIONS

Digital Video Signal Processing, Philips Publication 9398 332 60011, Feb. 1986, pp. 13-23.
Gruen, W. J. et al., "Theory of AFC Synchronization", Proceedings of the IRE, Aug. 1953, pp. 1043-1048.

Primary Examiner—John W. Shepperd
Attorney, Agent, or Firm—Paul J. Rasmussen; Eric P. Herrmann; Kenneth N. Nigon

[57] ABSTRACT

A digital television receiver which uses a line-locked clock signal employs chrominance signal demodulation circuitry which produces a digital oscillatory signal that is locked in phase to the color reference burst signal component of the incoming video signals. An analog voltage controlled oscillator generates an oscillatory signal having a frequency of approximately twice the color subcarrier frequency. This signal is combined with the composite video signals and the combined signal is digitized by an analog to digital converter. The digitized oscillatory signal is separated from the combined digital signal and is used to synchronize a digital phase locked loop. The digital phase locked loop generates two quadrature phase related signals having frequencies that are one-half the frequency of the analog oscillatory signal. These two signals are used to synchronously demodulate the chrominance signal components of the incoming video signals to obtain two quadrature phase related color difference signals. The control signal for the voltage controlled oscillator is generated by subtracting the burst phase of the demodulated color difference signals from a reference phase and integrating the difference.

12 Claims, 1 Drawing Figure

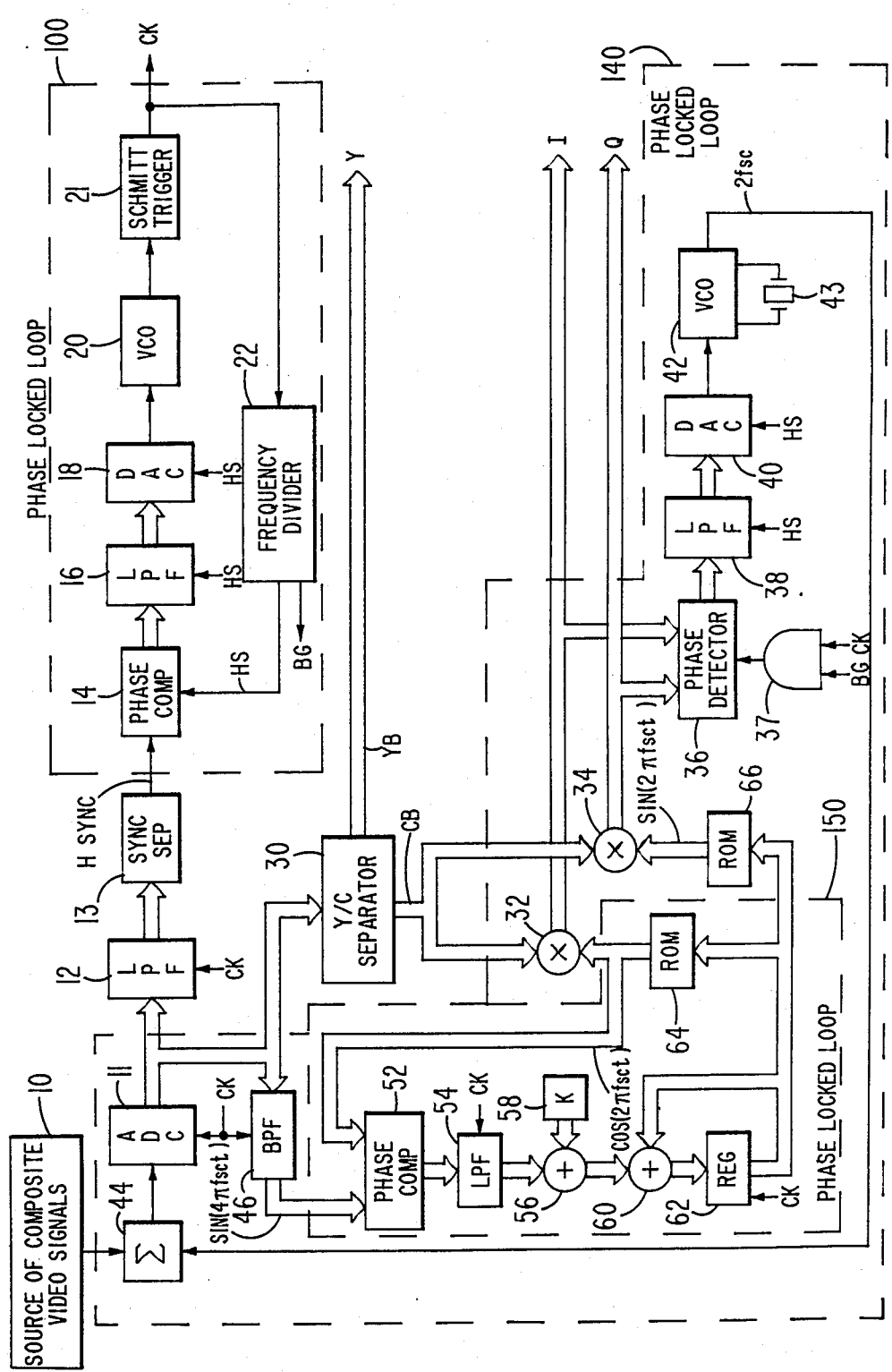

CHROMINANCE SIGNAL PHASE LOCKED LOOP SYSTEM FOR USE IN A DIGITAL TELEVISION RECEIVER HAVING A LINE-LOCKED CLOCK SIGNAL

The present invention relates to a phase locked loop (PLL) system which may be used in the chrominance signal demodulation circuitry of a digital television signal processing system having a clock signal that is locked in phase to the horizontal line synchronizing signal component of the processed video signals.

Many existing digital television receivers use clock signals that are locked in phase to the color reference burst component of the incoming television signals. The burst component occupies a small portion (the burst interval) of each horizontal line period and consists of eight to eleven cycles of a signal having the same frequency, $f_{sc}$, as the color subcarrier signal. Exemplary digital television receivers which use burst locked clock signals are those based on the DIGIT 2000 integrated circuits produced by ITT Intermetall GmbH. These receivers develop clock signals having a frequency, $4f_{sc}$, which is four times the color subcarrier frequency and which is locked in phase to the burst signal components of the incoming television signals.

The $4f_{sc}$ clock frequency is used to facilitate the demodulation of the chrominance signals into their color difference signal components. For example, in the receivers which use the DIGIT 2000 integrated circuits, the clock signal is locked at the phase of the color reference burst signal, this corresponds to the phase of the $-(B-Y)$ color difference signal. Sampling the video signal with such a clock signal results in chrominance signal components which may be represented as a series of samples $+(R-Y)$, $-(B-Y)$, $--Y)$, $+(B-Y)$, $+(R-Y)$... etc. where the positive and negative signs indicate sample phase, not sample polarity. The $(R-Y)$ and $(B-Y)$ color difference signals may be recovered from this sequence of samples by demultiplexing the $(R-Y)$ and $(B-Y)$ samples and inverting the signs of alternate samples in each of the two demultiplexed signals.

Receivers which use a burst locked clock signal and which include field or frame store processing elements such as field or frame comb filters or frame recursive noise reduction filters, may be unable to correctly process signals from a nonstandard source such as a video tape recorder (VTR) or video disc player. Signals from standard sources (e.g. broadcast or cablecast signals) have a predetermined and substantially invariant relationship between the frequency, $f_H$, of their horizontal line synchronizing signal components and the chrominance subcarrier frequency, $f_{sc}$. For example, in the NTSC system, $f_{sc}$ is the 455th harmonic of one-half of the line scanning frequency, $f_H$. Consequently, an analog to digital converter (ADC) responsive to a burst locked sampling clock signal having a frequency of $4f_{sc}$ develops 910 samples per line. For signals from standard sources, this number of samples is consistent from line-to-line and from field-to-field.

However, signals from nonstandard sources may not exhibit the same invariant relationship between $f_H$ and $f_{sc}$. In a nonstandard source, such as a VTR or video disc player, the chrominance subcarrier signal is typically generated by a resonant crystal controlled oscillator and, so, has a substantially invariant predetermined frequency. The horizontal line scanning signal components, however, are recovered from the recording medium and may vary significantly in phase from line-to-line and in frequency from field-to-field. These variations in $f_H$ may be caused by stretching of the tape or tape head misalignment in the VTR, disc eccentricity, or by motor speed fluctuations in either the VTR or disc player. Since the frequencies of burst signal and the horizontal line synchronizing signal of the nonstandard signals are not in a fixed relationship, an ADC which samples these signals using a burst-locked clock signal may produce varying numbers of samples from line-to-line and from field-to-field. If such a system were used with field or frame store processing elements, samples in successive fields or frames may not be properly aligned and the performance of the processing elements may be degraded.

One solution to this problem is to use a PLL that locks to the horizontal synchronizing signal component of the incoming video signals to generate a line-locked sampling clock signal. This PLL may have a relatively short time constant, for example, ten to fifteen horizontal line periods, to keep the number of samples per line substantially the same from line-to-line and from field-to-field.

While the use of a line-locked clock signal may ensure sample correspondence in field or frame store signal processing circuitry, it may not be conducive to color signal processing of the sampled signal. Since the clock signal is no longer in a fixed relationship with the burst signal, the samples of the chrominance signal are not necessarily represented by the sequence $+(R-Y)$, $-(B-Y)$, $-(R-Y)$, $+(B-Y)$, $+(R-Y)$... and consequently, the demultiplexing and sign inversion method of obtaining the separate color difference signals may produce distorted signals.

SUMMARY OF THE INVENTION

The present invention is embodied in chrominance signal demodulation circuitry for use in a digital television signal processing system. The digital television system includes an analog to digital converter which is responsive to a line-locked clock signal to develop digital samples representing incoming analog video signals. The chrominance signal demodulation circuitry includes circuitry for developing a digital oscillatory signal that is locked in phase to the color reference burst signal component of the processed video signals. This circuitry includes an analog oscillator which is responsive to a control signal for generating a variable frequency oscillatory signal having a range of frequencies that is outside the band of frequencies occupied by the incoming analog video signals. The analog oscillatory signal is combined with the incoming analog video signals and the combined signal is digitized by the analog to digital converter. The digital samples provided by the analog to digital converter are applied to a filter which separates components representing the oscillatory signal from any components representing the analog video signals. The samples representing the oscillatory signal are applied to circuitry which develops the digital oscillatory signal that is locked in phase to the analog oscillatory signal. This digital oscillatory signal is applied to circuitry which generates a digital signal that is proportional to the difference in phase between the digital oscillatory signal and the color reference burst signal. This phase difference signal is applied to circuitry which includes a low-pass filter to develop the control signal for the analog oscillator.

BRIEF DESCRIPTION OF THE DRAWING

The FIGURE is a block diagram of a portion of a digital television receiver embodying the present invention.

DETAILED DESCRIPTION

In the drawing, broad arrows represent busses for multiple-bit parallel digital signals and line arrows represent connections for conveying analog signals or single bit digital signals. Depending on the processing speed of the devices, compensating delays may be required in certain of the signal paths. One skilled in the art of digital signal processing circuit design would know where such delays would be needed in a particular system.

The FIGURE is a block diagram of a portion of a television signal processing system which includes three PLL's: 100, 140 and 150. The PLL 100 develops a sampling clock signal, CK, that is phase locked to the horizontal line synchronizing signal components of the incoming video signals. The PLL 140, which includes PLL 150, is a partly analog and partly digital PLL in which the digital components are clocked by the sampling clock signal CK. PLL 140 develops a first signal representing the chrominance subcarrier of the incoming video signals at a predetermined phase, $\phi$, and develops a second digital signal having a phase of $\phi + 90°$, that is, quadrature phase related to the first signal. These two signals are used to synchronously demodulate the chrominance signal components of the incoming video signals along quadrature phase related axes to develop two color difference signals.

In the FIGURE, a source of composite video signals, 10, which may, for example, include the tuner, IF amplifier and video detector of a conventional digital television receiver, provides analog composite video signals to one input terminal of a signal summing circuit 44. The second input terminal of the summing circuit 44 is coupled to receive an oscillatory signal, developed by a voltage controlled oscillator (VCO) 42, having a frequency outside of the band of frequencies occupied by the composite video signals. The summing circuit 44 combines these signals in a substantially linear manner and, so, produces a combined signal that is substantially free of heterodyne components. This combined signal is applied to an ADC 11. The ADC 11 which may, for example, be an eight-bit flash ADC, develops digital samples representing the combined signals at instants determined by the clock signal CK. These digital samples are filtered by a low-pass filter 12. The filter 12 which may, for example, have a frequency characteristic pass-band from 0 to 600 KHz, passes components of the combined signal corresponding to the synchronization signal components of the composite video signal to the relative exclusion of components corresponding to the oscillatory signal. The signals passed by the low-pass filter 12 are applied to sync separator circuitry 13.

The circuitry 13, for example, develops a signal, HSYNC, representing the horizontal line synchronizing signal component of the composite video signals. The signal HSYNC is applied to one input terminal of a phase comparator 14. An internally generated horizontal line synchronizing signal, HS, is applied to a second input terminal of the phase comparator 14. The circuitry which develops the signal HS is described below. Phase comparator 14, may, for example, be similar to the circuitry described in U.S. Pat. No. 4,506,175 entitled "Digital Phase Comparator Circuit Producing Sign and Magnitude Outputs" which is hereby incorporated by reference. The signal provided by the phase comparator 14 may, for example, correspond to the time delay between the leading edges of the respective pulse signals HSYNC and HS. This signal has positive values when the leading edges of the HSYNC pulses occur before the leading edges of the HS pulses and negative values when the leading edges of the HSYNC pulses occur after the leading edges of the HS pulses.

The signal provided by the phase comparator circuitry 14 is applied to a low-pass filter 16. Filter 16 is the loop filter of the PLL 100. The low-pass filtered phase difference signals provided by the filter 16 are applied to a digital to analog converter (DAC) 18. DAC 18 develops analog potential values representing the filtered phase difference signals and applies these values at a horizontal line rate to a VCO 20. The VCO 20, which may be of conventional design, is tuned to have a free running frequency of approximately R times $f_H$. In the present embodiment, R is the ordinal number of a harmonic of the horizontal line frequency, $f_H$, which approximates a multiple of the color subcarrier frequency. For example, in the NTSC system the frequency, $f_{sc}$, of the color subcarrier signal for standard signals is the 455th harmonic of one-half of the horizontal line frequency, and the frequency, $f_{CK}$, of the sampling clock signal is nominally four times the frequency of the color subcarrier signal. Consequently, the VCO 20 used in this embodiment has a free-running frequency of approximately 910 times the horizontal line frequency (R=910).

The output signal of the VCO 20 is applied to Schmitt trigger circuitry 21 which develops a square wave clock signal CK having a frequency, $f_{CK}$, equal to $Rf_H$. The signal CK is applied to frequency dividing circuitry 22, which divides the frequency of the signal CK by R to develop the signal HS, which has a frequency substantially equal to $f_H$. As set forth above, the signal HS is applied to the second input terminal of the phase comparator 14.

The circuitry 22 may, for example, include a 10-bit counter (not shown) which is configured to be reset when a count value of 910 is achieved. The frequency dividing circuitry 22 may further include circuit elements (not shown) coupled to the counter to detect count values corresponding to the beginning and end of the burst interval and for generating a burst gate signal, BG, which spans the time interval defined by those count values in each horizontal line period.

The PLL 100 generates the clock signal, CK, which tracks the varying line frequency of a nonstandard signal to provide a substantially uniform number of sampling clock pulses from line to line. In the present embodiment, the gain factors of the phase comparator 14, low-pass filter 16, DAC 18, VCO 20, Schmitt trigger 21 and frequency divider circuitry 22 are selected to achieve a loop time constant of approximately 15 horizontal line periods and a damping factor of 2. These gain values depend on the circuit elements to be used in the PLL and may be readily calculated by one skilled in the art of phase-locked loop design. An explanation of the relationship between the gain values, the damping factor and the PLL time constant may be found in Gruen, W. J. "Theory of AFC Synchronization" Proceedings of the IRE, Aug. 1953, pp. 1043-1048, which is hereby incorporated by reference.

The digital signals developed by the ADC 11 are also applied to Y/C separator circuitry 30. Circuitry 30 may include, for example, a low-pass filter (not shown) having a frequency response characteristic pass-band from 0 to 3 MHz and a band-pass filter (not shown) having a frequency response characteristic pass-band from 3 to 4.2 MHz for separating luminance and chrominance band signal components, respectively, from the signals provided by the ADC 11. In addition, the Y/C separator circuitry 30 may significantly attenuate components of the signal provided by the ADC 11 which correspond to the oscillatory signal generated by the VCO 42. The separated luminance and chrominance band signals are available via the output busses YB and CB of the circuitry 30, respectively.

The separated chrominance band signal components are applied to multipliers 32 and 34 which, using signals provided by the PLL 140, demodulate the chrominance band signals along two quadrature phase related demodulation axes to develop two baseband color difference signals, for example, I and Q.

These color difference signals are applied to a phase error detector 36. The clock signal applied to the phase error detector 36 is the logical AND of the signal CK and the burst gate signal, BG. This clock signal is generated by the AND gate 37. The phase error detector 36 may, for example, include circuitry (not shown) to separately accumulate baseband I and Q sample values during the burst interval and to divide the accumulated I values by the accumulated Q values to develop values representing the phase of the burst signal relative to the sampling instants of the I and Q samples. These values may be subtracted from a reference value representing the desired burst phase to generate a phase error value to control the PLL 140. The phase error values developed by the detector 36 are applied to a low-pass filter 38 at a rate of one sample per horizontal line period. The low-pass filter 38 is the loop filter of the PLL 140. Filter 38 is clocked by the signal HS generated by the PLL 100.

The filtered phase difference signals provided by the low-pass filter 38 are applied to a DAC 40. DAC 40 is clocked by the signal HS and develops an analog control signal for a VCO 42. The VCO 42, which may be of conventional design, includes a resonant crystal 43 which conditions the VCO 42 to have a free-running frequency that is outside of the band of frequencies occupied by the composite video signals. In the present embodiment, the resonant crystal 43 is selected to cause the free-running frequency of the VCO 42 to be approximately equal to twice the frequency of the chrominance subcarrier. As set forth above, the oscillatory signal developed by the VCO 42 is applied to the summing circuitry 44.

The digital samples developed by the ADC 11, which represent the combined signal developed by the summing circuitry 44, are applied to a band-pass filter 46. The filter 46 is responsive to the $4f_{sc}$ clock signal CK and may, for example, have a frequency response characteristic pass band from 6 MHz to 7.16 MHz ($2f_{sc}$). A filter having this frequency response characteristic pass band and being clocked by a $4f_{sc}$ clock signal also passes signals in the band of frequencies from 7.16 MHz to 8.32 MHz, however, the frequencies of these signals are aliased into the band of frequencies between 6 MHz and 7.16 MHz. Filter 46 passes the components of the digital samples representing the oscillatory signal developed by the VCO 42 to the substantial exclusion of any components representing composite video signals.

The digitized oscillatory signal passed by the band-pass filter 46 is applied as a reference signal to a phase comparator 52 of the PLL 150. The phase comparator 52 compares the phase of the digitized oscillatory signal to the phase of a regenerated subcarrier signal developed by the PLL 150 and provides a signal that is proportional to the phase difference between the two signals to a low-pass filter 54. The phase comparator 52 may, for example, be a conventional digital multiplier which multiplies the digitized oscillatory signal by the regenerated subcarrier signal to generate the phase difference signal. The filter 54, which is the loop filter of the PLL 150 integrates the phase difference signal provided by the phase comparator 52 to develop a frequency control signal. This frequency control signal is applied to a discrete time oscillator which includes adders 56 and 60, a digital value source 58 and a register 62. The discrete time oscillator operates as follows. The adder 56 adds the filtered phase difference signal to the constant value provided by the digital value source 58. The values provided by the adder 56 are accumulated by the adder 60 and register 62. When the accumulated value becomes larger than can be represented by the number of bit locations in the register 62, an overflow condition occurs and the accumulation continues with the residue of the overflow. Consequently, the discrete time oscillator produces an oscillatory signal having a sawtooth waveform. The frequency of this oscillatory signal $f_{osc}$ may be expressed by the equation:

$$f_{osc} = (IN/2^m)f_{ck}. \text{ tm (1)}$$

Where IN is the signal developed by the adder 56, m is the number of bit locations in the register 62 and $f_{ck}$ is the frequency of the clock signal. For example, in the present embodiment of the invention, the register 62 is a twenty-bit register, the value K is $2^{18}$ or 262,144 and the clock signal, CK, has a nominal frequency of 910 $f_H$ or approximately $4f_{sc}$. Using the equation (1), the free-running frequency of the discrete time oscillator, $f_{osc}$, is 227.5 $f_H$ or approximately $f_{sc}$. The sawtooth waveform provided by the register 62 is applied to the address input ports of read only memories 64 and 66 which are programmed to produce output values corresponding, respectively, to the cosine and sine of the values applied to their input ports, normalized to $2\pi$ radians. The cosine ($2\pi f_{sc}t$) signal developed by the ROM 64 is applied to the phase comparator 52 to complete the feedback loop for the PLL 150. Furthermore, the signal developed by the ROM 64 and the sine ($2\pi f_{sc}t$) signal developed by the ROM 66 are applied to the respective multipliers 32 and 34 to synchronously demodulate the quadrature phase related chrominance band signals provided by the Y/C separator 30 to produce the two color difference signals I and Q.

The PLL's 140 and 150 are configured in a master-slave relationship. The demodulated color burst components of the processed video signals control the frequency and phase of the oscillatory signal produced by the VCO 42 which in turn, controls the frequency and phase of the signals produced by the PLL 140. The PLL 150 is included in the system to increase the quantization resolution of the signal provided by the band-pass filter 46, which may be relatively small as the system approaches a locked state, and to change the frequency of the signal provided by the band-pass filter 46 from a nominal value of $2f_{sc}$ to a nominal value of $f_{sc}$.

The oscillatory signal developed by the VCO 42 has a frequency of approximately $2f_{sc}$ and occupies a relatively small range of amplitude values to minimize the potential for interference between the oscillatory and composite video signals when they are combined.

In the present embodiment of the invention, the signal provided by the VCO 42 is scaled to occupy a range of amplitude values corresponding to sixteen quantization levels of the ADC 11. This signal is added to the composite video signals from source 10 which, in this embodiment, occupy a range of amplitude values corresponding to 236 quantization levels of the ADC 11. The combined analog signal occupies a range of amplitude values corresponding to 252 quantization levels, which is less than the 256 quantization-level range of the eight-bit ADC 11.

Since the nominal frequency of the oscillatory signal provided by the VCO 42 is $2f_{sc}$ and the nominal frequency of the sampling clock signal, CK, is $910 f_H$ or approximately $4f_{sc}$, there may be instances in which the oscillatory signal components of the combined signal are sampled at less than their Nyquist rate. This may occur when the frequency of the oscillatory signal becomes greater than $455f_H$ or when the frequency of the sampling clock signal becomes less than $4 f_{sc}$. In these instances, the frequency of the signal passed by the band-pass filter 46 may not be the same as the frequency of the oscillatory signal developed by the VCO 42; it may be an alias frequency, a reflection of the frequency of the oscillatory signal about the Nyquist limit frequency. Since the oscillatory signal, in these instances, is sampled at a rate less than the Nyquist rate, the signal provided by the band-pass filter 46 is effectively a sub-sampled signal. While this subsampling changes the apparent frequency of the oscillatory signal it does not significantly affect the phase of the oscillatory signal relative to the phase of the signal developed by the PLL 150. Consequently, the subsampling does not significantly affect the performance of the PLL's 140 and 150. The frequency control signal for the PLL 150 is developed, in the present embodiment of the invention, by multiplying the signal provided by the band-pass filter 46 by the output signal of the PLL 150 in the phase comparator 52, to develop a phase difference signal, and then integrating the phase difference signal in the low-pass filter 54.

As an example of how the phase relationships of aliased and non-aliased oscillatory signals act to change the frequency of the signal produced by the PLL 150 in opposite directions, consider the values presented in Table I. In this example it is assumed that the sampling clock signal, CK, and the signal cosine $(2\pi f_{sc}t)$ provided by the PLL 150 are aligned in frequency and that there are frequency differences of 40° per cycle, in the first instance and −40° per cycle, in the second instance, in the oscillatory signal developed by the VCO 42 relative to an oscillatory signal that would be aligned in frequency with the signal provided by the PLL 150. To simplify the explanation of this example, the signal provided by the ROM 64 is referred to as $\cos \omega t$, and the oscillatory signal developed by the VCO 42 is referred to as $\sin(b\ \theta + 40°)t$ in the first instance and $\sin(\theta - 40°)t$ in the second instance.

TABLE I

| $\omega$ | $\cos \omega t$ | $\theta + 40°$ | $\sin(\theta + 40°)t$ | $\theta - 40°$ | $\sin(\theta - 40°)t$ |
|---|---|---|---|---|---|
| $T_0$ | 0 | 1 | 0 | 0 | 0 | 0 |
| $T_1$ | 90 | 0 | 200 | −.34 | 160 | .34 |
| $T_2$ | 180 | −1 | 40 | .64 | 320 | −.64 |
| $T_3$ | 270 | 0 | 240 | −.86 | 120 | .86 |
| $T_4$ | 0 | 1 | 80 | .98 | 280 | −.98 |
| $T_5$ | 90 | 0 | 280 | −.98 | 80 | .98 |
| $T_6$ | 180 | −1 | 120 | .87 | 240 | −.87 |
| $T_7$ | 270 | 0 | 320 | −.64 | 40 | .64 |
| $T_8$ | 0 | 1 | 160 | .34 | 200 | −.34 |
| $T_9$ | 90 | 0 | 0 | 0 | 0 | 0 |

Multiplying the values of the $\cos \omega t$ signal by the values of the $\sin(\theta - 40°)t$ signal and summing the products over $T_0$ through $T_9$ yields a frequency correction signal value of 0.19. This corresponds to the non-aliased condition and indicates, correctly, that the frequency of the signal developed by the PLL 150 should be increased to align it with the oscillatory signal developed by the VCO 42. Performing the same operations on the $\cos \omega t$ and $\sin(\theta + 40°)t$ signals yields a frequency correction signal value of −0.19. This corresponds to the aliased condition and correctly indicates that the frequency of the signal developed by the PLL 150 should be decreased to align it with the oscillatory signal developed by the VCO 42. In general, the phase of an aliased signal provided by the band-pass filter 46 is opposite to the phase of the corresponding non-aliased signal and, so, produces a correction signal having the opposite polarity.

As set forth above in the equation (1), the frequency of the signals developed by the PLL 150 is a function of the frequency control signal developed by the low-pass filter 54 and of the frequency of the clock signal CK. Since the clock signal CK is developed by the line-locked PLL 100, it may change in frequency from line-to-line and from field-to-field to track changes in the phase and frequency of the horizontal line synchronizing signal components of the processed video signals. To mitigate the effects of the changing clock frequency on the signals produced by the PLL 150, the components in the PLL are selected to achieve a loop time constant substantially equal to that of the PLL 100. Consequently, the PLL 150 tracks changes in the frequency of the clock signal CK as well as changes in the frequency of the signal provided by the VCO 42 so that the frequency and phase of the signals provided by the PLL 150 are primarily functions of the phase error signal developed by the phase detector 36.

What is claimed is:

1. In a digital television signal processing system including a source of analog composite video signals, occupying a predetermined band of frequencies and having a color reference burst signal component, a source of clock signal, having an indeterminate phase relationship with said color reference burst signal, and an analog to digital converter having an input terminal and an output terminal for generating, at said output terminal a digital signal representing values of an analog signal applied to said input terminal at instants determined by said clock signal, circuitry for developing a digital oscillatory signal having a predetermined phase relationship with said color reference burst signal comprising:

an analog oscillator, responsive to a control signal for generating a variable frequency oscillatory signal having a frequency outside of said predetermined band of frequencies;

means coupled to said source of analog composite video signals and to said analog oscillator for combining the respective signals provided thereby to develop a signal for application to the input terminal of said analog to digital converter;

signal filtering means coupled to the output terminal of said analog to digital converter for attenuating components of the signal provided thereby which represent said composite video signals relative to components which represent said oscillatory signal;

means coupled to said signal filtering means for generating said digital oscillatory signal being locked in phase to the signal provided by said signal filtering means; and means, including phase comparison means coupled to said digital phase locked loop and to said source of composite video signals, for generating said control signal, being proportional to the difference in phase between said digital oscillatory signal and said color reference burst signal.

2. The circuitry set forth in claim 1 wherein said control signal generating means further includes means for integrating said phase difference signal to develop said control signal.

3. The circuitry set forth in claim 2 wherein:
said color reference burst signal has a predetermined frequency;
said control signal tends to cause said analog oscillator to produce said oscillatory signal having a frequency substantially equal to twice said predetermined frequency; and
said digital phase locked loop is responsive to said oscillatory signal to produce said digital oscillatory signal having a frequency substantially equal to said predetermined frequency.

4. The circuitry set forth in claim 3 wherein said digital phase locked loop comprises:
first means coupled to said filtering means for generating a signal corresponding to the difference in phase between said digital oscillatory signal and the signal provided by said filtering means;
second means for integrating the phase difference signal provided by said first means;
sample accumulating means including sample storage means and sample summing means for adding the signal provided by the second means to values provided by the sample storage means, and to store the resultant sample value in said sample storage means.

5. The circuitry set forth in claim 4 wherein said first means comprises means for multiplying said digital oscillatory signal by the signal provided by said filtering means.

6. Apparatus comprising:
a source of composite video signals occupying a predetermined band of frequencies and having a chrominance signal component including a color reference burst signal component;
a source of clock signal having an indeterminate phase relationship with said color reference burst signal;
an analog oscillator responsive to a control signal for generating a variable frequency oscillatory signal having a frequency outside of said predetermined band of frequencies;

means coupled to said source of composite video signals and to said analog oscillator for combining the respective signals provided thereby;

analog to digital conversion means coupled to said combining means for generating a digital sampled data signal representing said combined signal at instants determined by said clock signal;

signal filtering means coupled to said analog to digital converter for attenuating components of the signal provided thereby representing said composite video signals relative to components representing said oscillatory signal;

a digital phase locked loop coupled to said signal filtering means for generating a digital oscillatory signal being locked in phase to the signal provided by said signal filtering means; and means for generating said control signal including phase comparison means coupled to said digital phase locked loop and to said source of composite video signals for generating a signal proportional to the difference in phase between said digital oscillatory signal and said color reference burst signal.

7. The apparatus set forth in claim 6 wherein said control signal generating means further includes means for integrating said phase difference signal to develop said control signal.

8. The apparatus set forth in claim 7 wherein:
said color reference burst signal has a predetermined frequency;
said control signal tends to cause said analog oscillator to produce said oscillatory signal having a frequency substantially equal to twice said predetermined frequency; and
said digital phase locked loop is controlled by said oscillatory signal to produce said digital oscillatory signal having a frequency substantially equal to said predetermined frequency.

9. The apparatus set forth in claim 8 wherein said digital phase locked loop comprises:
first means coupled to said filtering means for generating a signal corresponding to the difference in phase between said digital oscillatory signal and the signal provided by said filtering means;
second means for integrating the phase difference signal provided by said first means;
sample accumulating means including a register having a plurality of storage cells for holding one sample, and sample summing means for adding the signal provided by the second means to the sample value provided by the sample storage means and to store the resultant sample value in said sample storage means; and
third means responsive to successive sample values provided by said sample storage means for generating sample values constituting said digital oscillatory signal, wherein said digital oscillatory signal approximates a sinusoidal signal.

10. The apparatus set forth in claim 9 wherein said first means comprises means for multiplying said digital oscillatory signal by the signal provided by said filtering means.

11. The apparatus set forth in claim 10 wherein said composite video signal further includes horizontal line synchronizing signal components and said source of clock signal generates a clock signal that is locked in phase to said horizontal line synchronizing signal components.

12. The apparatus set forth in claim 11 wherein:

said digital phase locked loop generates a further digital oscillatory signal being quadrature phase related to said digital oscillatory signal; and said control signal generating means includes:

first and second synchronous detecting means coupled to receive the digital oscillatory signal and the further digital oscillatory signal respectively at respective first input ports and to receive the chrominance signal component of said composite video signals at respective second input ports, said first and second synchronous detecting means providing first and second color difference signals at respective output ports;

phase comparison means coupled to said first and second synchronous detecting means for generating a phase difference signal proportional to the ratio of the sample values of said first and second color difference signals; and means for integrating said phase difference signal to develop said control signal.

* * * * *

UNITED STATES PATENT AND TRADEMARK OFFICE
CERTIFICATE OF CORRECTION

PATENT NO. : 4,700,217

DATED : October 13, 1987

INVENTOR(S) : Alvin R. Balaban et al.

It is certified that error appears in the above-identified patent and that said Letters Patent is hereby corrected as shown below:

Column 1, Line 35 - "--Y)" should read -- -(R-Y) -- ; and

Column 6, Line 34 - equation (1) should read $$f_{osc} = (IN/2^m) f_{ck}$$

Signed and Sealed this

Twentieth Day of December, 1988

Attest:

DONALD J. QUIGG

*Attesting Officer*    *Commissioner of Patents and Trademarks*